US012565158B2

(12) United States Patent
Wehr

(10) Patent No.: US 12,565,158 B2
(45) Date of Patent: Mar. 3, 2026

(54) INSERT FOR REDUCING MOVEMENT AND VIBRATION

(71) Applicant: Simon Wehr, San Juan Capistrano, CA (US)

(72) Inventor: Simon Wehr, San Juan Capistrano, CA (US)

( * ) Notice: Subject to any disclaimer, the term of this patent is extended or adjusted under 35 U.S.C. 154(b) by 192 days.

(21) Appl. No.: 18/478,326

(22) Filed: Sep. 29, 2023

(65) Prior Publication Data

US 2024/0123918 A1 Apr. 18, 2024

Related U.S. Application Data

(60) Provisional application No. 63/416,425, filed on Oct. 14, 2022.

(51) Int. Cl.
*B60R 13/08* (2006.01)
(52) U.S. Cl.
CPC ................................. *B60R 13/0884* (2013.01)
(58) Field of Classification Search
CPC ....... B60R 13/0884; B60R 13/06; E06B 1/68; E06B 1/6069; F16B 2/14; Y10T 292/73; Y10T 428/24479; E05C 17/54
See application file for complete search history.

(56) References Cited

U.S. PATENT DOCUMENTS

| | | | | | |
|---|---|---|---|---|---|
| 466,104 | A | * | 12/1891 | Naegele ................. | E05C 17/54 |
| | | | | | 292/343 |
| 1,351,453 | A | * | 8/1920 | Wells, Jr. ................. | E06B 3/44 |
| | | | | | 428/156 |
| 1,689,194 | A | * | 10/1928 | Clark ..................... | B60R 13/06 |
| | | | | | 277/649 |

FOREIGN PATENT DOCUMENTS

GB 2282428 A * 4/1995 ............. E04G 25/00

* cited by examiner

*Primary Examiner* — Catherine A. Simone
(74) *Attorney, Agent, or Firm* — Concourse Law Group; Katherine B. Sales, Esq.

(57) ABSTRACT

A tiered, wedge-shaped insert for reducing noise and/or vibration caused by a first surface contacting a second surface, the insert having at least one upper body portion forming a top surface of the insert, one or more middle body portions, each body portion have a pair of ledges that extend along opposed front and rear surfaces of the insert, and a wedge-shaped tip, wherein the middle body portions are disposed between the upper portion and the tip. A generally wedge-shaped insert having a top surface, a wedge-shaped bottom portion, opposed front and back surfaces, and two opposed side surfaces.

8 Claims, 5 Drawing Sheets

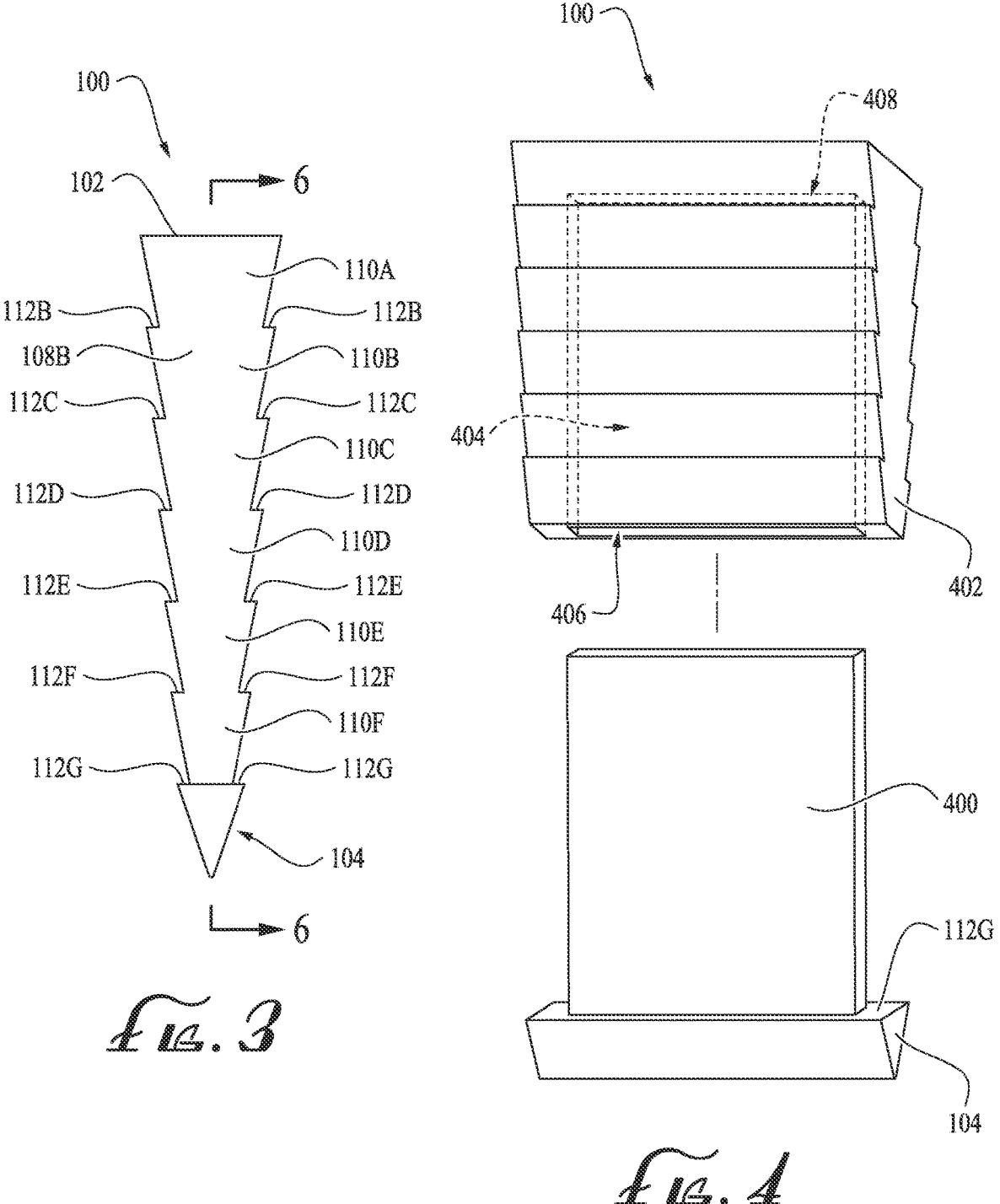
_fig. 3_
_fig. 4_

100A

100B

100C

INSERT FOR REDUCING MOVEMENT AND VIBRATION

CROSS-REFERENCE TO RELATED APPLICATIONS

This United States Non-Provisional Patent application claims priority to U.S. Provisional Patent Application Ser. No. 63/416,425, titled "Insert for Reducing Movement and Vibration," filed Oct. 14, 2023, the contents of which are incorporated by reference herein in their entirety.

BACKGROUND

When a vehicle is in movement, often times users will hear rattling and/or feel vibration when one or more interior parts rub against each other. The rattling noise can be very irritating and it can be difficult to stop it.

Accordingly, there is a need for an insert that can easily be inserted between one or more interior panels/components of a vehicle to reducing movement and vibration, thereby reducing or eliminating the rattling noise caused by the movement and/or vibration of two or more interior panels.

SUMMARY

The present invention addresses this need. In a first embodiment, the present invention is directed to a tiered, wedge-shaped insert for reducing noise caused by a first surface contacting a second surface. The insert comprises at least one deformable outer layer having an internal cavity with an open end and a closed end, at least one rigid core disposed within the cavity of the outer layer, and at least one tip portion coupled to the core and disposed outside the outer layer, wherein the outer layer forms a series of fusto-pyramidal shaped body portions that narrow in width from an upper body portion to the tip portion.

Optionally, at least one of the body portions has a pair of ledges that extend along a front and rear surface of the insert.

In a second embodiment, the present invention is directed to a tiered, wedge-shaped insert comprising at least one upper body portion forming a top surface of the insert, one or more middle body portions, each body portion have a pair of ledges that extend along opposed front and rear surfaces of the insert, and a wedge-shaped tip, wherein the middle body portions are disposed between the upper portion and the tip.

Optionally, the tip is coupled to a rigid core that extends inside the insert.

In a third embodiment, the present invention is directed to a generally wedge-shaped insert comprising a top surface, a wedge-shaped bottom portion, opposed front and back surfaces, and two opposed side surfaces.

Optionally, the insert has a rigid, arrow-shaped core made from hard plastic or nylon.

Optionally, the insert has an outer layer that surrounds a portion of the core and is made from a flexible and/or deformable material.

Optionally, the outer layer is tiered or toothed.

Optionally, the insert is between about 15 mm to about 30 mm wide and between about 15 mm and 40 mm high.

In a fourth embodiment, the present invention is directed to a kit comprising a plurality of wedge-shaped inserts, wherein each insert comprises a top surface, a wedge-shaped bottom portion, opposed front and back surfaces, and two opposed side surfaces.

Optionally, each insert has a rigid, arrow-shaped core made from hard plastic or nylon.

Optionally, each insert has an outer layer that surrounds a portion of the core and is made from a flexible and/or deformable material.

Optionally, the outer layer of each insert is tiered or toothed.

Optionally, each insert is between about 15 mm to about 30 mm wide and between about 15 mm and 40 mm high.

DRAWINGS

These and other features, aspects, and advantages of the present invention will become better understood with regard to the following description, appended claims, and accompanying drawings.

FIG. 3 is a left side plan view of the insert of FIG. 1, wherein the right side plan view is a mirror image thereof;

FIG. 4 is an exploded view of the insert of FIG. 1;

DESCRIPTION

Figures 1, 2:
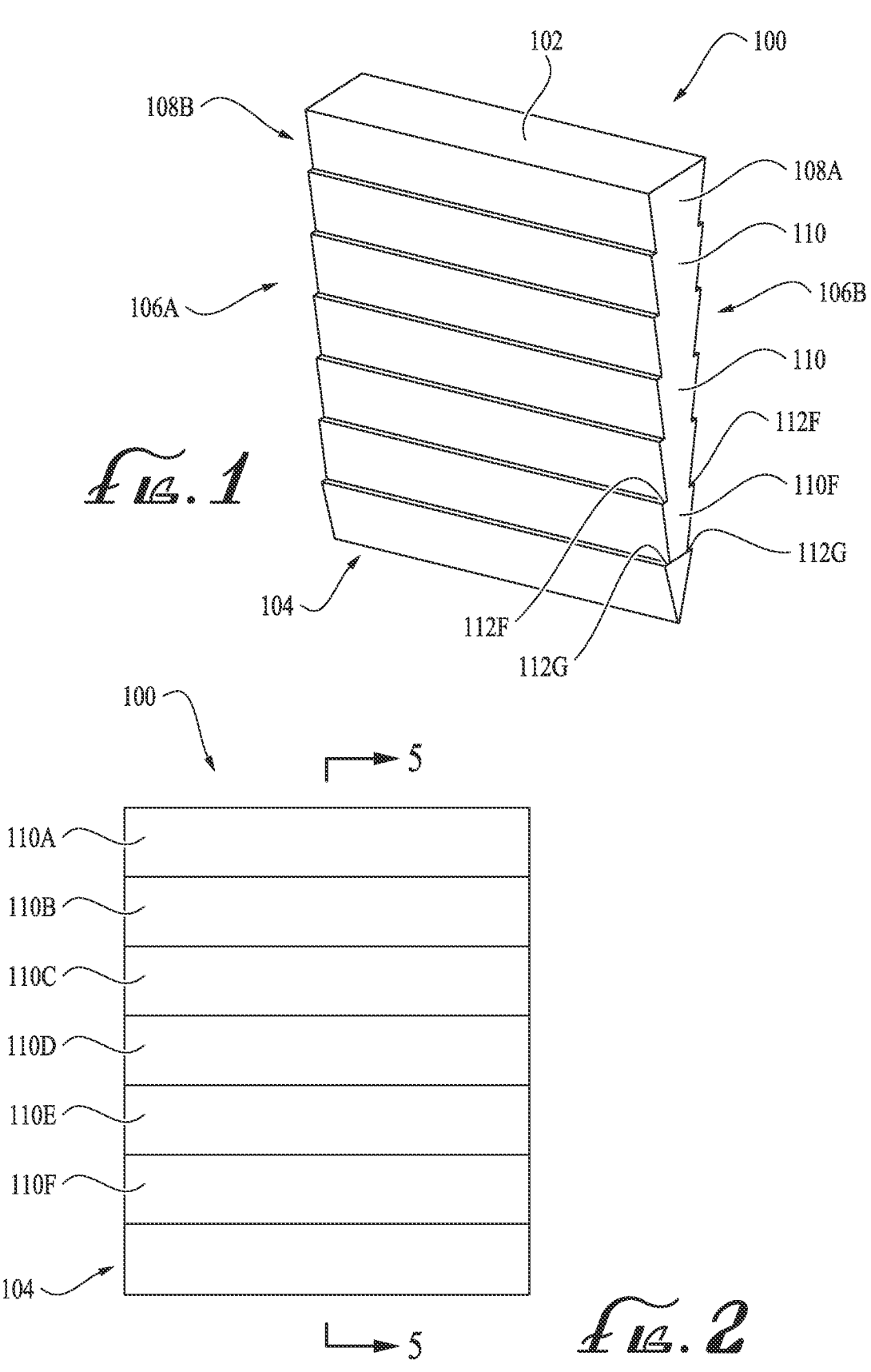
FIG. 1 is a front perspective view of an insert having features of the present invention.
FIG. 2 is a front plan view of the insert of FIG. 1, wherein the rear plan view is a mirror image thereof.

As used herein, the following terms and variations thereof have the meanings given below, unless a different meaning is clearly intended by the context in which such term is used.

The terms "a," "an," and "the" and similar referents used herein are to be construed to cover both the singular and the plural unless their usage in context indicates otherwise.

As used in this disclosure, the term "comprise" and variations of the term, such as "comprising" and "comprises," are not intended to exclude other additives, components, integers ingredients or steps.

All dimensions specified in this disclosure are by way of example only and are not intended to be limiting. Further, the proportions shown in these Figures are not necessarily to scale. As will be understood by those with skill in the art with reference to this disclosure, the actual dimensions and proportions of any system, any device or part of a device disclosed in this disclosure will be determined by its intended use.

Referring now to FIGS. 1-7, the invention is directed to an insert 100 for reducing rattling noises in a vehicle caused by rubbing and/or movement a first surface 802 against a second surface 804 (typically two or more interior panels) See below and FIGS. 8 and 9 for more detail regarding use.

The insert 100 is generally wedge shaped, having at least one top surface 102, at least one wedge-shaped bottom portion 104, opposed front and back surfaces 106A, 106B, and two opposed side surfaces 108A, 108B.

Both the front and back surfaces 106A, 106B, and the opposed side surfaces 108A, 108B can be smooth or have some sort of texture and/or can be tiered or toothed, as shown in the figures. Optionally, the surfaces 106A, 106B, 108A, 108B can comprise any combination of the above.

If tiered, as shown in the figures, the insert 100 comprises a plurality of upside-down frusto-pyramidal shaped body sections 110 that are stacked on top of each other, and the width of these section 110 progressively narrow from the top surface 102 being the widest, to the wedge-shaped bottom portion 104, being the narrowest. The wedge-shaped tip 104 is coupled to the last body section 110, and is conveniently configured for ease of insertion between panels.

The insert 100 can comprises as few as zero body sections 110, such that the insert 100 only comprises the tip 104, or alternatively, can comprise one or more body sections 110 depending on the need of the user. As shown in the Figures, an exemplary version of the insert 100 has six (6) body sections 110A, 1108, 110C, 110D, 110E, 110E total, and one tip portion 104. However, the insert 100 can comprise less than six body portions 110 and alternatively, more than six body portions 110, depending on the needs of the user. In some instances, an insert 100 having six body portions 110 may be too long and not recess entirely between the panels is intended to silence. Alternatively, more than six body portions 110 may be necessary as the panels may require a longer/taller insert 100 to effectively reduce noise and/or vibration.

A pair of ledges 112 is formed at the connection between the middle body sections 110B-110F, which helps secure the insert 100 in place and reduces its ability to be pulled backwards, out of the gap between panels. Specifically, middle body sections 110B-110F each have a pair of corresponding ledges 112B-112F on the front and rear surfaces 106A, 106B of the insert 100, which can be best seen in FIGS. 1 and 3. Tip 104 also has a pair of ledges 112G along the front and rear surfaces 106A, 106B of the insert 100. The upper body section, which in the Figures is element 110A, does not have a pair of ledges 112, and instead forms the top surface 102 of the insert 100.

Figure 6:
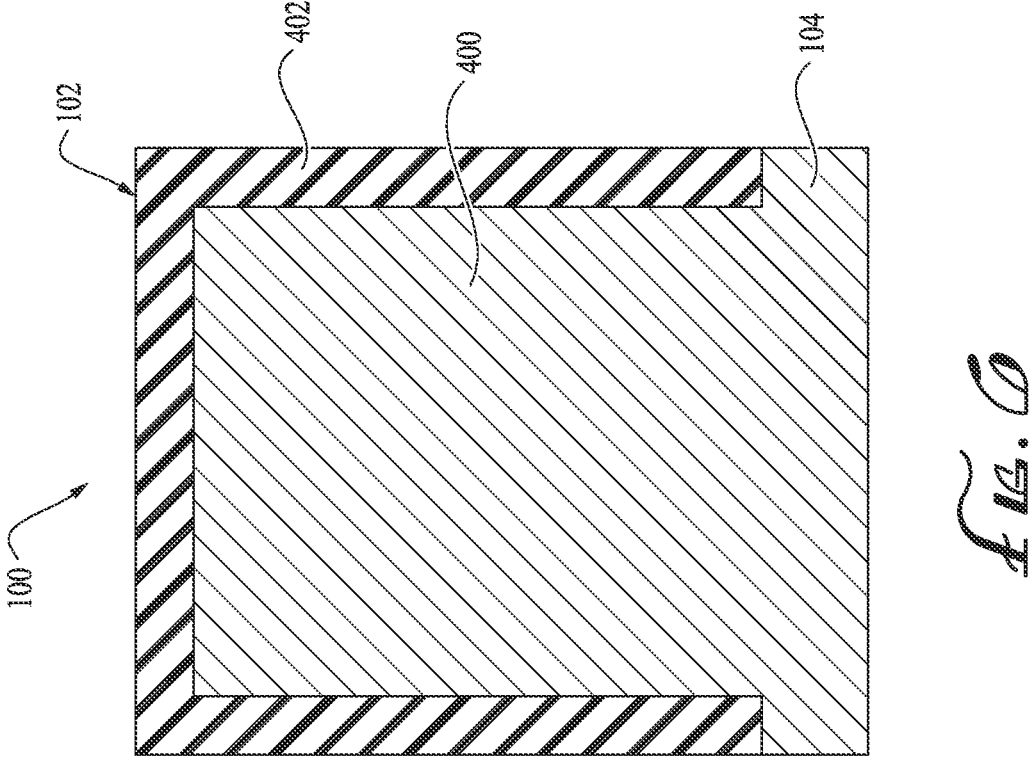
FIG. 6 is a sectional view of the insert of FIG. 3, taken along line 6-6.
Figure 5:
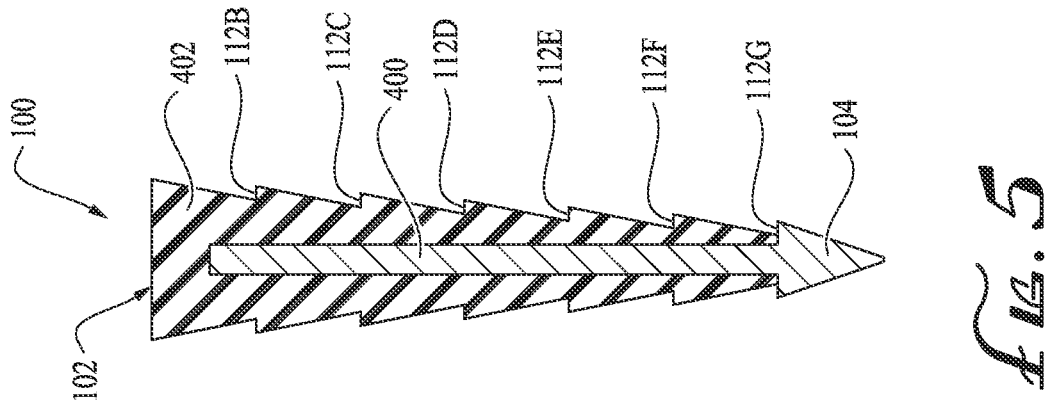
FIG. 5 is section view of the insert of FIG. 2, taken along line 5-5.

Referring now to FIGS. 4 through 6, there is shown the interior structure of the insert 100. The insert 100 can be hollow or solid and can be made from any material including but not limited to metal, plastic, wood, rubber or a composite material, or any combination thereof.

Preferably, the insert 100 comprises at least one rigid core 400 that is coupled to the tip portion 104, such that the core and tip 400, 104, when viewed together, are shaped like an arrow. Optionally, the core 400 and the tip 104 are a single, integrated unit that is formed from a single piece of material. This integrated structure can be seen in FIGS. 5 and 6.

The core 400 is configured to be retained within at least one outer layer 402 that surrounds at least a portion of the core 400. Preferably, the outer layer 402 has at least one cavity 404 that is configured to receive and retain the at least one core 400. The cavity 404 has an open end 406 and a closed end 408. Optionally, but not necessarily, an adhesive can be used to secure the core 400 within the recess 404 of the outer layer 402. Preferably, the outer layer 402 is made of a flexible/deformable material which forms the tiered/toothed structure noted above.

Optionally, the outer layer 402 can comprise more than one cavity 404, wherein each cavity 404 is configured to receive and retain at least one core 400, such that the insert 100 can comprise more than one core 400.

Figure 7:
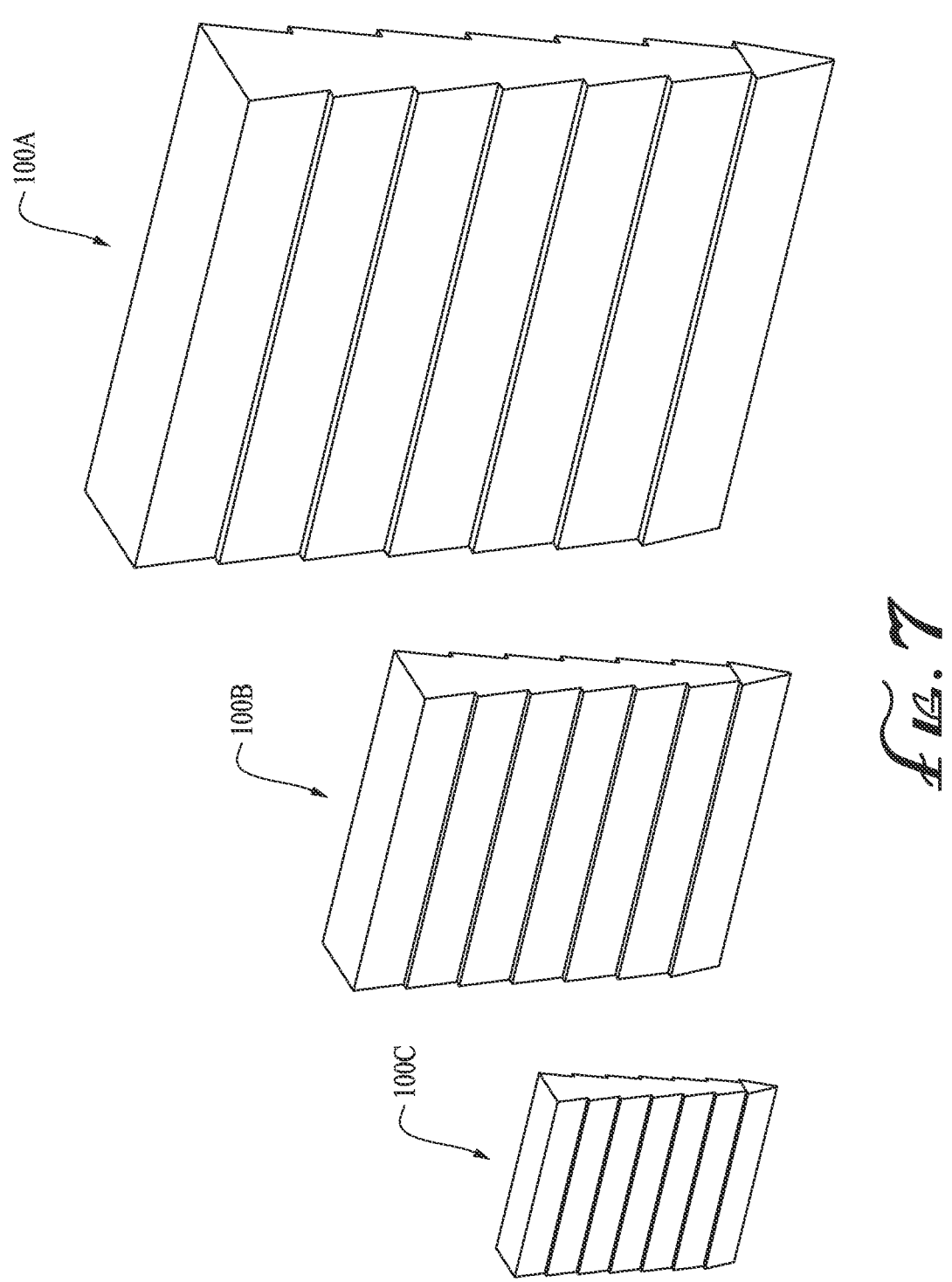
FIG. 7 is a front perspective view of the insert of FIG. 1, wherein multiple sizes of the insert are shown.

Referring now to FIG. 7, the insert 100A, 100B, 100C can be any size, but preferably the insert 100 is between about 15 mm to about 30 mm wide, and between about 15 mm and about 40 mm high. Optionally, the insert 100 comes in at least three sizes: 15 mm wide by 15 mm high, 25 mm wide by 25 mm high, and 30 mm wide and 40 mm high. The insert 100 can have dimensions of any combination anywhere in the ranges noted above.

In a second embodiment, the invention comprises a kit, and the kit comprises at least one, but preferably seven (7) inserts 100 that comprise four small (15 mm×15 mm) inserts 100, two medium (25 mm×25 mm) inserts 100 and one large (30 mm×40 mm) insert 100. However, the kit can comprise any number and combination of inserts 100 in different sizes.

Figure 9:
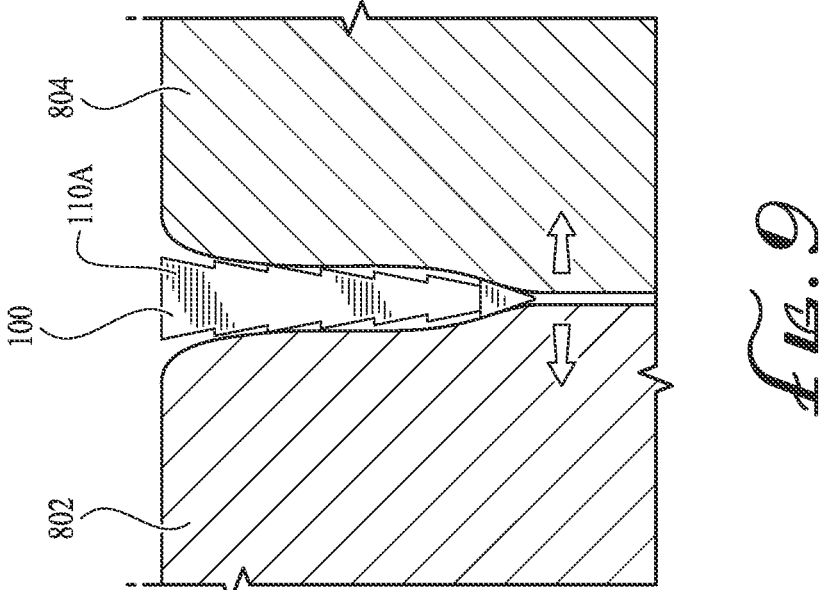
FIG. 9 is a second step of inserting the insert of FIG. 1.
Figure 8:
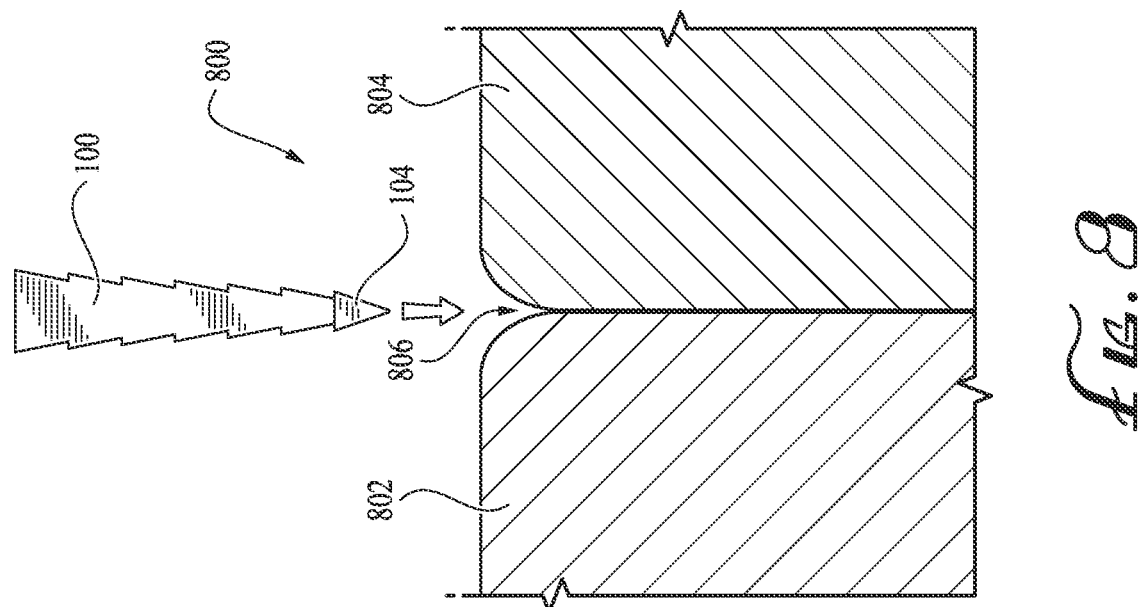
FIG. 8 is a first step of inserting the insert of FIG. 1.

Referring now to FIGS. 8 and 9, a method 800 of using the insert 100 to reduce noise and vibration is shown. The method 800 comprises the following steps:

a) First, while the vehicle is moving, the user identifies the area that is causing noise by pressing firmly along interior joints where two or more panels 802, 804 meet, and the rattle or squeak appears to be coming from, and continues pressing and applying pressure until the rattling or noise stops or reduces.

b) Alternatively, the rattle or noise may be located by gently banging with the user's palm or bottom of the hand on different areas of the interior or dash of the vehicle.

c) Once the location of the noise is determined, the user selects the appropriate size of insert 100 according to the gap 806 between the two interior panels 802, 804. The user should select an insert 100 that has a top surface 102 that is slightly wider than the gap 806 between the interior panels 802, 804.

d) Next, the user carefully and slowly presses the insert 100, tip 104 first, into the gap 806 until the upper body portion 110A, and top surface 102, of the insert 100 is nearly flush with the interior joint 806. The user should not push the insert 100 too deep into the gap 806 because the insert 100 could fall into the gap 806.

e) And finally, the user can repeat steps a) through d) with additional inserts 100 until all further rattles or squeaks have been reduced and/or eliminated.

Although the present invention has been described in considerable detail with reference to certain preferred embodiments, other embodiments are possible. The steps disclosed for the present methods, for example, are not intended to be limiting nor are they intended to indicate that each step is necessarily essential to the method, but instead are exemplary steps only. Therefore, the scope of the appended claims should not be limited to the description of preferred embodiments contained in this disclosure. All references cited herein are incorporated by reference.

Features of the Invention Include:

1. A wedge-shaped insert for reducing noise cause by a first surface contacting a second surface, the insert comprising:
   a) a top surface;
   b) a wedge-shaped bottom portion;
   c) opposed front and back surfaces; and
   d) two opposed side surfaces.

2. The insert of feature 1, wherein the insert has a rigid, arrow-shaped core made from hard plastic or nylon.

3. The insert of feature 2, wherein the insert has an outer layer that surrounds a portion of the core and is made from a flexible and/or deformable material.

4. The insert of feature 3, wherein the outer layer is tiered or toothed.

5. The insert of feature 1, wherein the insert is between about 15 mm to about 30 mm wide and between about 15 mm and 40 mm high.

5

6

6. A kit comprising:
a) a plurality of wedge-shaped inserts for reducing noise
   cause by a first surface contacting a second surface,
   each insert comprising:
   i. a top surface;
   ii. a wedge-shaped bottom portion;
   iii. opposed front and back surfaces; and
   iv. two opposed side surfaces.
7. The kit of feature 6, wherein each insert has a rigid,
arrow-shaped core made from hard plastic or nylon.
8. The kit of feature 7, wherein each insert has an outer
layer that surrounds a portion of the core and is made from
a flexible and/or deformable material.
9. The insert of feature 8, wherein the outer layer of each
insert is tiered or toothed.
10. The kit of feature 1, wherein each insert is between
about 15 min to about 30 mm wide and between about 15
mm and 40 mm high.
What is claimed is:
1. A tiered, wedge-shaped insert for reducing noise caused
by a first surface contacting a second surface, the insert
comprising:
   a) a deformable outer layer having an internal cavity with
   an open end and a closed end;
   b) a rigid core disposed within the cavity of the outer
   layer; and
   c) a tip portion coupled to the core and disposed outside
   the outer layer;
   wherein the outer layer forms a series of fusto-pyramidal
   shaped body portions that narrow in width from an
   upper body portion to the tip portion.

2. The insert of claim 1, wherein at least one of the body
portions has a pair of ledges that extend along a front and
rear surface of the insert.
3. The insert of claim 1, wherein the core is made from
hard plastic or nylon.
4. The insert of claim 1, wherein the insert is between
about 15 mm to about 30 mm wide and between about 15
mm and 40 mm high.
5. A kit comprising:
a) a plurality of wedge-shaped inserts for reducing noise
   caused by a first surface contacting a second surface,
   each insert comprising:
   i) a deformable outer layer having an internal cavity
   with an open end and a closed end;
   ii) a rigid core disposed within the cavity of the outer
   layer; and
   iii) a tip portion coupled to the core and disposed
   outside the outer layer,
   wherein the outer layer forms a series of fusto-pyra-
   midal shaped body portions that narrow in width
   from an upper body portion to the tip portion.
6. The kit of claim 5, wherein the core of each insert has
an arrow-shape made from hard plastic or nylon.
7. The kit of claim 5, wherein each insert is between about
15 mm to about 30 mm wide and between about 15 mm and
40 mm high.
8. The kit of claim 5, wherein at least one of the body
portions of each insert has a pair of ledges that extend along
a front and rear surface of the insert.

* * * * *